UNITED STATES PATENT OFFICE.

WALLACE A. BEATTY, OF NEW YORK, N. Y., ASSIGNOR, BY DIRECT AND MESNE ASSIGNMENTS, TO GEORGE W. BEADLE, OF NEW YORK, N. Y.

PLASTIC COMPOUND AND PROCESS OF MAKING SAME.

1,158,961.     Specification of Letters Patent.     Patented Nov. 2, 1915.

No Drawing. Application filed April 30, 1912, Serial No. 694,274. Renewed March 5, 1913. Serial No. 752,253.

*To all whom it may concern:*

Be it known that I, WALLACE A. BEATTY, a citizen of the United States, residing at New York, in the county of New York and State of New York, have invented certain new and useful Improvements in Plastic Compounds and Processes of Making Same, of which the following is a specification.

This invention relates to a method of producing a plastic composition of matter as well as to said composition as a new article of manufacture, and has for one of its objects to produce said article in a less expensive and more expeditious manner than has been heretofore proposed.

With this and other objects in view the invention consists in the novel steps and combinations of steps and in the novel product constituting my invention all as will be more fully hereinafter disclosed and particularly pointed out in the claims.

Generally stated the new product consists of a cellulose ester and a condensation product of acetone or its homologues with phenol and its homologues.

More specifically stated the invention consists in producing a product which closely resembles and may be substituted for celluloid, by mixing dioxy-diphenyl-dimethyl-methane with nitro cellulose as will now appear.

It has been found, by experiment, that a plastic substance may be obtained in accordance with the foregoing by mixing nitro-cellulose and dioxy-diphenyl-dimethyl methane, the formula of which may be written as follows:

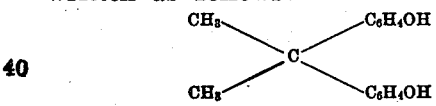

In the instance herein given, the proportions of the constituents and method of operation is substantially as follows:

Eighty (80) parts by weight of nitro-cellulose and twenty (20) parts by weight of dioxy-diphenyl-dimethyl-methane are dissolved in a suitable solvent, as amylacetate alone, or amylacetate mixed with acetone. In carrying out the operation the excess of solvent is evaporated until the desired viscosity, or density, of the mass is attained and such density of course will depend upon the particular use for which the substance is intended.

The product obtained with either of the procedures, disclosed herein, may be used in various arts for the manufacture of diverse articles and materials, such for example as moving picture films, and, in fact, wherever celluloid is now employed.

The above mentioned dioxy-diphenyl-dimethyl-methane may be conveniently produced as a condensation product by reacting on phenol with acetone, as disclosed in my copending application filed June 6, 1912, Serial Number 702,046 and entitled Artificial gum and process of making the same.

It is obvious that those skilled in the art may vary the proportions of the product, as well as the steps of my process without departing from the spirit of the invention and therefore I do not wish to be limited to the above disclosure except as may be required by the claims.

What I claim is:

1. A plastic composition comprising a cellulose ester; dioxy diphenyl dimethyl methane; and a solvent, substantially as described.

2. A plastic composition comprising nitro-cellulose; dioxy diphenyl dimethyl methane; and a solvent, substantially as described.

3. A plastic composition comprising nitro-cellulose; dioxy diphenyl dimethyl methane; and amylacetate, substantially as described.

4. A plastic composition comprising nitro-cellulose; dioxy diphenyl dimethyl methane; and amylacetate with acetone, substantially as described.

5. The method of producing a plastic substance consisting in mixing nitro-cellulose with dioxy diphenyl dimethyl methane in the presence of a suitable liquid solvent, and evaporating to a mass of the desired viscosity, substantially as described.

6. A composition of matter comprising a cellulose ester and dioxy-diphenyl-dimethyl-methane, substantially as described.

7. A composition of matter comprising a cellulose ester; a condensation crystalline product of a ketone with a hydroxy derivative of an aromatic hydrocarbon and a solvent, substantially as described.

8. A composition of matter comprising a cellulose ester; a condensation crystalline product of a ketone with a hydroxy derivative of an aromatic hydrocarbon and amylacetate, substantially as described.

9. A composition of matter comprising a cellulose ester; a condensation crystalline product of a ketone with a hydroxy derivative of an aromatic hydrocarbon; amylacetate; and acetone, substantially as described.

10. A composition of matter comprising nitro-cellulose and a condensation crystalline product of a ketone with a hydroxy derivative of an aromatic hydrocarbon, substantially as described.

11. A composition of matter comprising nitro-cellulose and a condensation crystalline product of a ketone with a hydroxy derivative of an aromatic hydrocarbon and amylacetate, substantially as described.

12. A composition of matter comprising nitro-cellulose and a condensation crystalline product of a ketone with a hydroxy derivative of an aromatic hydrocarbon, amylacetate and acetone, substantially as described.

In testimony whereof I affix my signature in presence of two witnesses.

WALLACE A. BEATTY.

Witnesses:
H. H. Byrne,
Chas. E. Breckons.